United States Patent

Okada

[11] Patent Number: 5,903,703
[45] Date of Patent: May 11, 1999

[54] RECORDING APPARATUS AND REPRODUCTION APPARATUS STORING DATA OF A NUMBER OF SUBFRAMES

[75] Inventor: Masaki Okada, Yokohama, Japan

[73] Assignee: Canon Kabushiki Kaisha, Japan

[21] Appl. No.: 08/320,833

[22] Filed: Oct. 7, 1994

Related U.S. Application Data

[63] Continuation of application No. 07/935,908, Aug. 27, 1992, abandoned.

[30]  Foreign Application Priority Data

Aug. 28, 1991 [JP] Japan .................................. 3-217020

[51] Int. Cl.[6] ...................................................... H04N 5/91
[52] U.S. Cl. .............................................. 386/95; 386/109
[58] Field of Search ..................................... 360/35.1, 9.1, 360/11.1; 358/335, 133, 909, 906; 386/95, 109; 348/384, 220

[56]  References Cited

U.S. PATENT DOCUMENTS

| | | | |
|---|---|---|---|
| 4,172,264 | 10/1979 | Taylor et al. ............................ | 358/185 |
| 4,783,704 | 11/1988 | Funston .................................. | 360/11.1 |
| 4,800,448 | 1/1989 | Kaneko et al. ......................... | 360/35.1 |
| 4,827,347 | 5/1989 | Bell ........................................ | 358/906 X |
| 4,918,523 | 4/1990 | Simon et al. .......................... | 360/32 X |
| 5,032,927 | 7/1991 | Watanabe et al. ................... | 358/133 X |
| 5,073,820 | 12/1991 | Nakagawa et al. .................... | 358/133 |
| 5,138,447 | 8/1992 | Shen et al. .............................. | 358/133 |

*Primary Examiner*—Andrew L. Sniezek
*Attorney, Agent, or Firm*—Fitzpatrick, Cella, Harper & Scinto

[57]  ABSTRACT

Individual images included in a multi-frame image can be reproduced in an enlarged scale by an easy operation. Information indicating the number of split frames of a multi-frame image and information indicating the number of photographed images included in the multi-frame image are recorded on a recording medium together with images constituting the multi-frame image. In the reproduction mode, each of images constituting the multi-frame image is reproduced and output on one frame with reference to the reproduced information indicating the number of split frames of the multi-frame image and the reproduced information indicating the number of photographed images included in the multi-frame image.

12 Claims, 6 Drawing Sheets

FIG. 6A
FIG. 6B
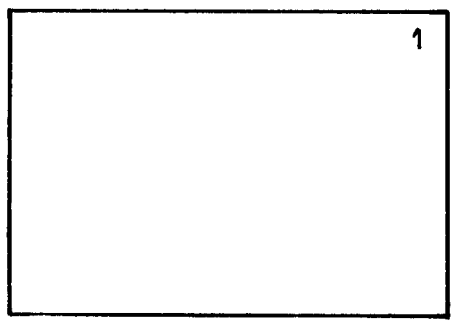
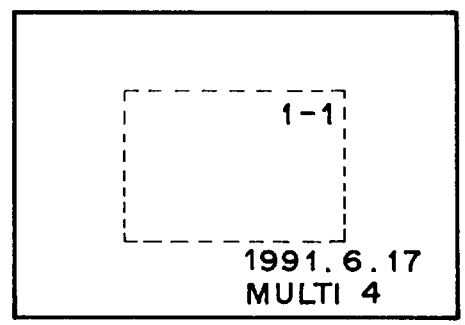
FIG. 6C
FIG. 6D

RECORDING APPARATUS AND REPRODUCTION APPARATUS STORING DATA OF A NUMBER OF SUBFRAMES

This application is a continuation of application Ser. No. 07/935,908 filed Aug. 27, 1992, now abandoned.

BACKGROUND OF THE INVENTION

1. Field of the Invention

The present invention relates to a recording apparatus and a reproduction apparatus for a still image.

2. Related Background Art

As a still image recording medium, a still video floppy utilized in a still video camera (or an electronic still camera) is known. The recording format of the still video floppy is standardized by the still video committee, and the floppy records a video signal for one field per track. A standard floppy has 50 tracks. Therefore, the floppy can record a maximum of 50 field images, and can record 25 frame images. The still video floppy also has audio and data recording formats in addition to the still image recording format.

Digital circuit elements have become popular due to low-cost memories, and an electronic still camera tends to have a memory capable of storing image data for at least one frame, and a digital signal processor (DSP) for performing digital signal processing of image data stored in the memory. The DSP can easily produce a multi-frame image in which a plurality of images are arranged in one frame. The DSP can also easily enlarge/reduce an image.

However, in the prior art, it has been difficult to individually reproduce and display images recorded as a multi-frame image. For example, the number of images constituting a multi-frame image or the number of photographed images included in a multi-frame image cannot be detected unless these images are reproduced and displayed. Also, it is not easy to designate and display each of the images constituting a multi-frame image in an enlarged scale.

SUMMARY OF THE INVENTION

It is an object of the present invention to provide a recording apparatus and a reproduction apparatus which can solve the above-mentioned problems.

It is another object of the present invention to provide a recording apparatus and a reproduction apparatus which have improved operability.

It is still another object of the present invention to provide a recording apparatus and a reproduction apparatus which have novel functions.

According to one preferred aspect of the present invention, there is provided a recording apparatus for recording images to be recorded as a multi-frame image on a recording medium, wherein at least one of information indicating the number of split frames of the multi-frame image and information indicating the number of recording images included in the multi-frame image is recorded on the recording medium.

Other objects and features of the present invention will be apparent from the following description of the embodiment taken in conjunction with the accompanying drawings.

BRIEF DESCRIPTION OF THE DRAWINGS

FIGS. 6A to 6D are views showing examples of displayed frames of this embodiment.

DETAILED DESCRIPTION OF THE PREFERRED EMBODIMENT

The preferred embodiment of the present invention will be described below with reference to the accompanying drawings.

Figure 1:
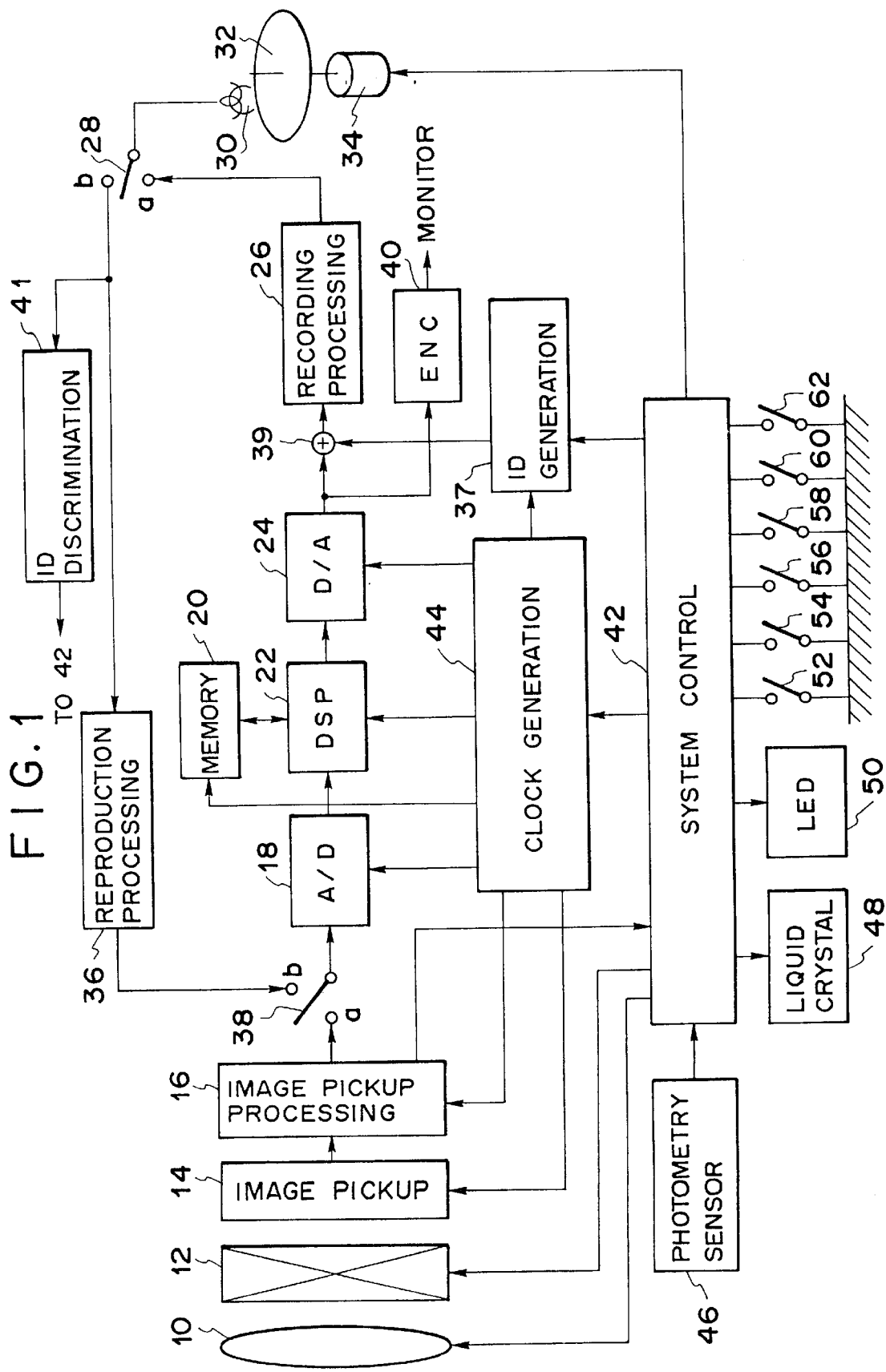
FIG. 1 is a block diagram showing an arrangement according to an embodiment of the present invention.

FIG. 1 is a block diagram showing an arrangement of an apparatus according to the embodiment of the present invention. The apparatus shown in FIG. 1 includes a photographing lens 10, a diaphragm 12, an image pickup element 14, an image pickup processing circuit 16 for sampling and holding the outputs from the image pickup element 14, performing gamma correction and white balance adjustment, and outputting an image signal in a predetermined format, an A/D converter 18 for converting an analog signal into a digital signal, a memory 20 having a storage capacity of at least one frame, a digital signal processor (DSP) 22 for performing digital signal processing (e.g., enlargement/reduction processing) of a photographed or reproduced image by utilizing the memory 20, a D/A converter 24 for converting a digital output from the DSP 22 into an analog signal, a recording processing circuit 26 for performing recording processing such as FM modulation of the output signal from the D/A converter 24, a switch 28 which is connected to a contact a in a recording mode, and is connected to a contact b in a reproduction mode, a magnetic head 30 for recording/ reproduction, a magnetic disc 32 called a still video floppy, and a motor 34 for rotating the magnetic disc 30.

The apparatus also includes a reproduction processing circuit 36 for performing reproduction processing such as FM demodulation of an output reproduced by the magnetic head 30 input through the switch 28, a switch 38 for supplying the output from the reproduction processing circuit 36 or the output from the image pickup processing circuit 16 to the A/D converter 18, and a video encoder 40 for converting the output from the D/A converter 24 into a standard television signal (e.g., an NTSC television signal), and supplying its output to, e.g., an internal or external monitor device.

The apparatus also includes an ID generation circuit 37 for generating a data signal (to be described later) to be recorded together with data, i.e., a video signal output from a system control circuit 42 (to be described later), an adder 39 for adding the output from the D/A converter 24 to the output from the ID generation circuit 37, and an ID discrimination circuit 41 for extracting an ID signal from a reproduction signal.

The apparatus also includes a system control circuit 42 for controlling the entire apparatus, a clock generation circuit 44 for supplying predetermined clocks to the image pickup element 14, the image pickup processing circuit 16, the A/D converter 18, the memory 20, the DSP 22, and the D/A converter 24 under the control of the system control circuit 42, a photometry sensor 46 for exposure control, a liquid crystal display device 48, and a light-emitting diode 50.

The apparatus further includes a recording/reproduction switch 52 for switching between the recording mode and the reproduction mode, a multi-frame switch 54 for setting a multi-frame mode, an up switch 56 for controlling track movement of the magnetic head 30 in the inner peripheral direction, a down switch 58 for controlling track movement of the magnetic head 30 in the outer peripheral direction, a photographing preparation switch 60 for controlling preparation for a photographing operation (exposure control and focusing control), and a photographing switch 62 for controlling exposure of the image pickup element 14. Normally, when a release button is slightly depressed, the photographing preparation switch 60 is turned on, and when the release button is further depressed, the photographing switch 62 is turned on.

In this embodiment, when the multi-frame switch 54 is ON, the multi-frame mode is set. For example, in the recording mode, the DSP 22 reduces a photographed image to 1/n in an area ratio (e.g., n=16) by thinning out pixels (by, e.g., orthogonally transforming input image data to quantize or mask high-frequency components with a large coefficient). In this case, n can be changed by the up switch 56 and the down switch 58. The compression ratio of the DSP 22 can be changed according to the change in n. For this purpose, for example, the pixel thinning out ratio or the coefficient for quantizing frequency components can be changed.

The fundamental Signal flow in FIG. 1 will be briefly described below.

The image pickup element 14 is exposed by the photographing preparation switch 60 and the photographing switch 62, and its output is subjected to gamma correction and video signal conversion by the image pickup processing circuit 16. The output from the image pickup processing circuit 16 is supplied to the A/D converter 18 through the switch 38, and is converted into a digital signal. The DSP 22 writes the output from the A/D converter 18 in the memory 20 without any modifications or by compressing the output as described above.

Image data stored in the memory 20 is read out, and is supplied to the D/A converter 24 through the DSP 22. The memory 20 consists of first and second areas each having a storage capacity for one frame (or field). The D/A converter 24 converts a digital image signal into an analog image signal, and the recording processing circuit 26 performs recording processing of the output from the D/A converter 24. The output from the recording processing circuit 26 is supplied to the magnetic head 30 through the switch 28, and is recorded on the magnetic disc 32.

In the reproduction mode, the output from the magnetic head 30 is supplied to the reproduction processing circuit 36 through the switch 28, and the reproduction processing circuit 36 outputs a reproduced image signal. The reproduced image signal output from the reproduction processing circuit 36 is supplied to the A/D converter 18 through the switch 38. The A/D converter 18 converts the reproduced image signal into a digital signal, and the DSP 22 writes the output from the A/D converter 18 without any modifications or in an enlarged scale. The output from the magnetic head 30 is also supplied to the ID discrimination circuit 41. The ID discrimination circuit 41 separates and extracts an ID signal superposed on the image signal, and outputs the extracted ID signal to the system control circuit 42.

Image data written in the memory 20 is read out, and is supplied to the D/A converter 24 through the DSP 22. The D/A converter 24 converts the image data into an analog signal. The video encoder 40 converts the output from the D/A converter 24 into a standard television signal, and the output from the video encoder 40 is displayed as an image on a monitor device.

Figure 2:
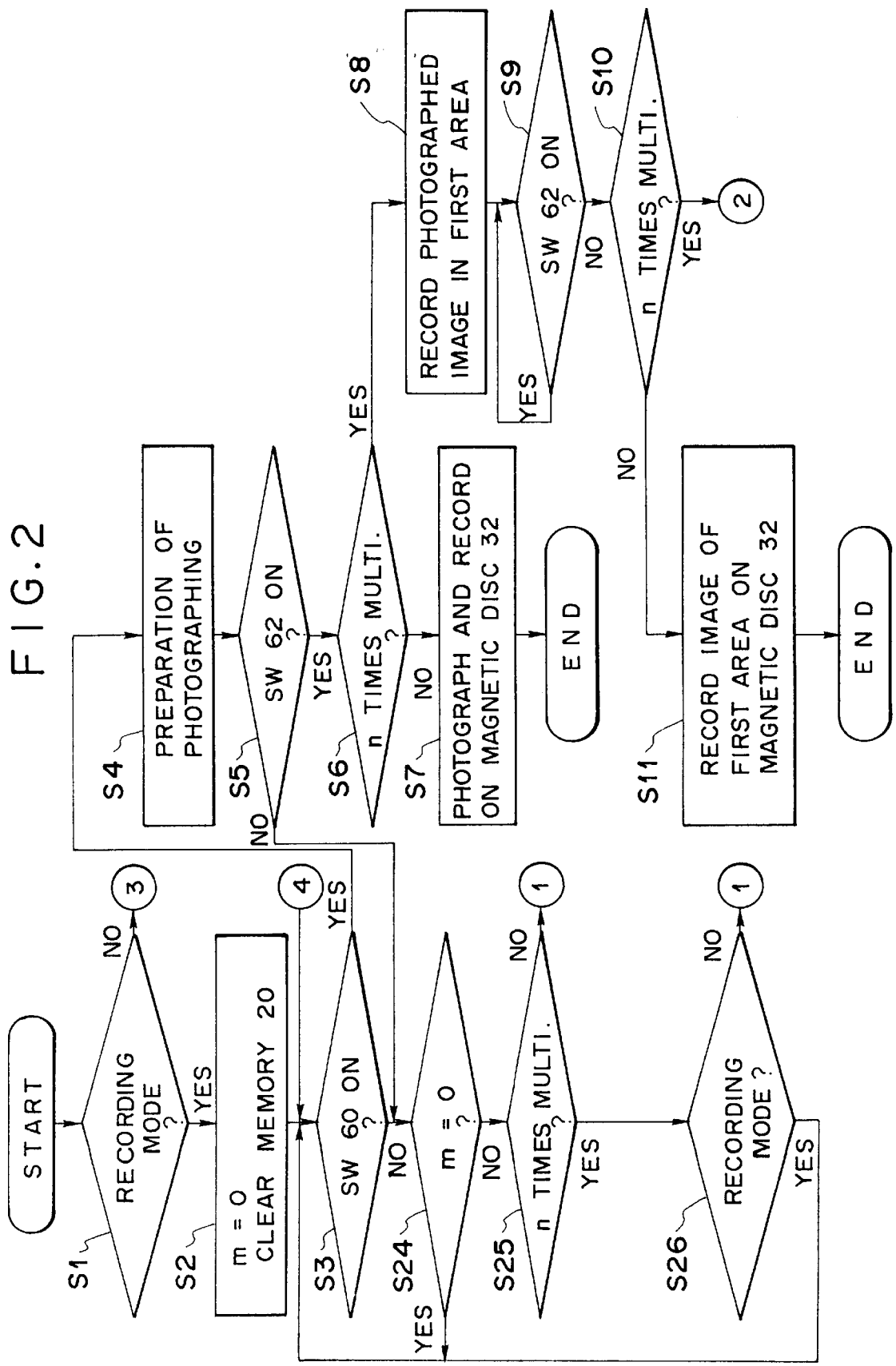
FIG. 2 is a partial flow chart showing an operation of this embodiment.
Figure 3:
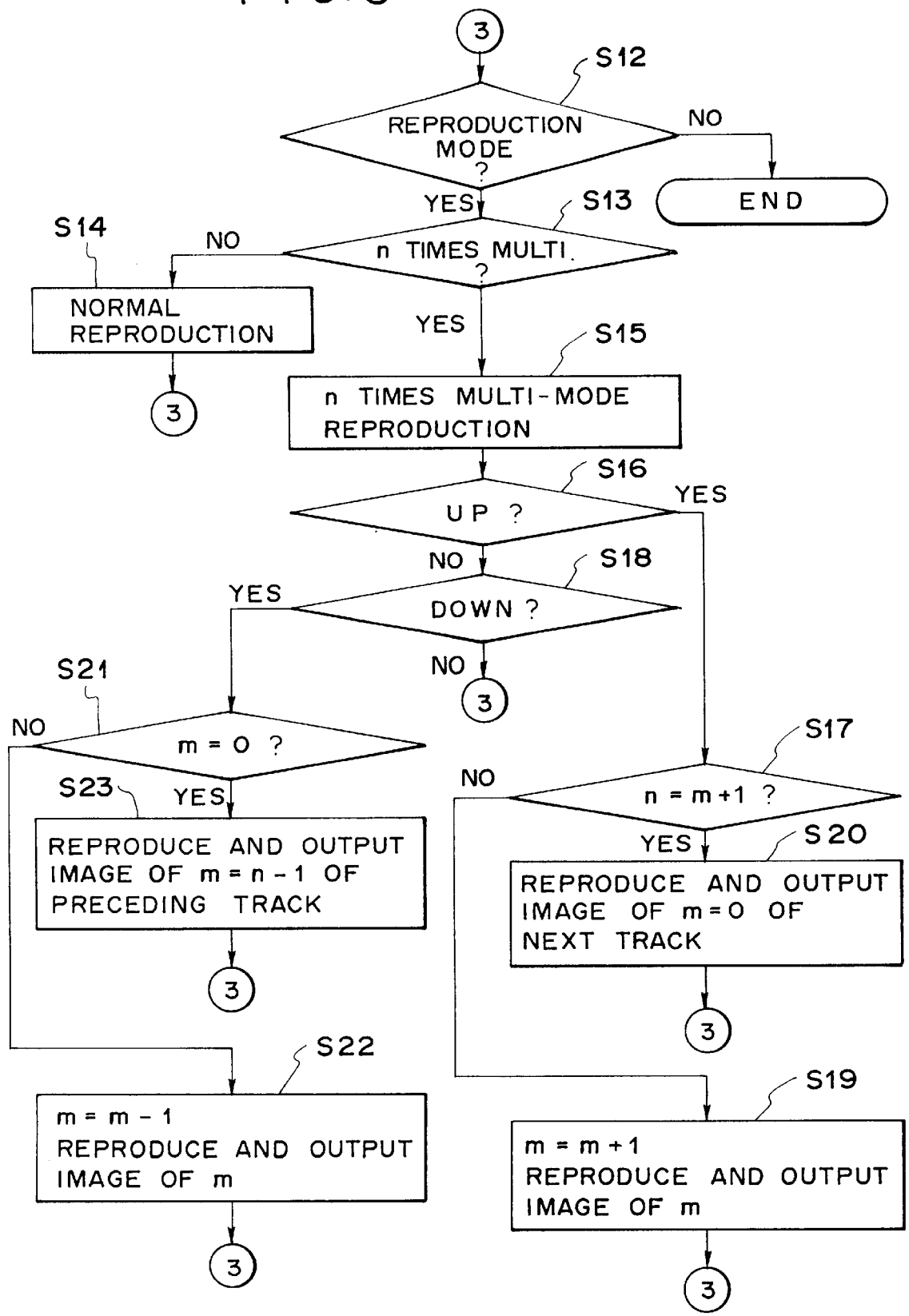
FIG. 3 is a partial flow chart showing the operation of this embodiment.
Figure 4:
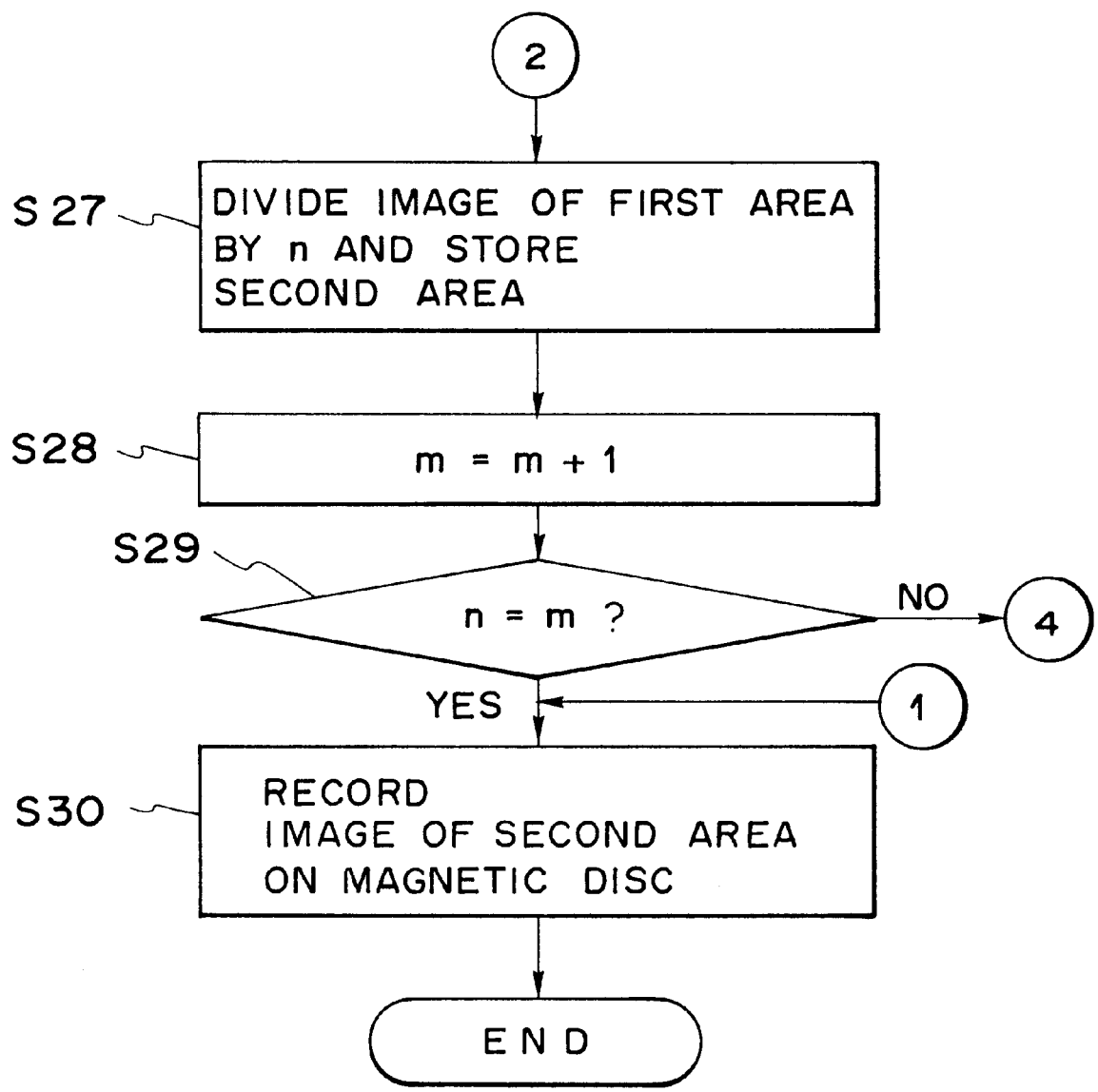
FIG. 4 is a partial flow chart showing the operation of this embodiment.

The operation of this embodiment will be described below with reference to the flow charts shown in FIGS. 2, 3, and 4. Note that FIGS. 2, 3, and 4 are flow charts when the memory 20 has a storage capacity for two frames (or fields).

When the recording/reproduction switch 52 is set in the recording mode (S1), the system control circuit 42 clears the memory 20, and resets its internal counter m to 0 (S2). When the photographing preparation switch 60 is turned on (S3), preparation of a photographing operation such as a photometry operation based on the output from the photometry sensor 46 is performed (S4). When the photographing switch 62 is turned on (S5), and the multi-frame switch 54 is not ON (S6), the image pickup element 14 is exposed, and a photographed image is recorded on the magnetic disc 32 (S7), thus ending the processing.

If the multi-frame mode is set (i.e., the multi-frame switch 54 is ON) (S6), a photographed image obtained by the image pickup element 14 is stored in the first area of the memory 20 (S8), and the control waits until the photographing switch 62 is temporarily turned off (S9). If the multi-frame mode is cancelled (S10), the image in the first area is recorded on the magnetic disc 32 (S11), thus ending processing. If the multi-frame mode is set (S10), the image in the first area is reduced to 1/n in the area ratio, and the reduced image is stored at a position corresponding to m in the second area of the memory 20 (S27). Thereafter, m is incremented by one (S28). When n=m (S29), i.e., when an images for one frame is stored in the second area, the image in the second area is recorded on the magnetic disc 32 (S30), thus ending processing. The flow returns to step S3 to continue photographing operation until m=n (S29).

When the image in the second area is to be recorded on the magnetic disc (S30), the ID generation circuit 37 is caused to generate an ID signal including information such as values n and m, a date, a track number, and the like, and the ID signal is recorded at the same time. In this embodiment, when n≠m, monochrome images having uniform brightness are recorded in portions having no photographed images.

A position where the reduced image is stored in step S27 is a position corresponding to a frame position shown in, e.g., FIG. 6A or 6B. For example, when m=0, the image is stored at a position #1; when m=1, the image is stored at a position #2; and when m =15, the image is stored at a position #16.

If m=0 (S24) before the photographing preparation switch 60 is turned on (S4) or before the photographing switch 62 is turned on (S5) even after the photographing preparation switch 60 is turned on and the preparation for the photographing operation is performed, the flow returns to step S3 to wait until the photographing preparation switch 60 is turned on. Once a photographing operation is performed in the n times multi-frame mode, and image information is stored in the second area of the memory 20, i.e., when m≠0 (S24), and the n times multi-frame mode is canceled (S25), or when the recording mode is canceled even in the n times multi-frame mode (S25, S26), the image in the second area is recorded on the magnetic disc 32 (S30), thus ending processing.

When the recording/reproduction switch 52 is set in the reproduction mode (S12), normal reproduction processing is executed (S14) if the n times multi-frame mode is not selected. If the n times multi-frame mode is selected (S13), multi-mode reproduction processing is executed (S15). More specifically, an image is enlarged to n times in the area ratio (i.e., to a full frame size) according to the value n of reproduced images included in the ID signal output from the ID discrimination circuit 41, and the enlarged image is stored in the memory 20. The image stored in the memory 20 is then reproduced and output. In this case, the image is reproduced and output according to the value m like in the recording mode. For example, m (1 in this case) is displayed on the upper right corner of the frame, as shown in FIG. 6C.

When the up switch 56 is turned on (S16), if n≠m+1, m is incremented, and an image of m is reproduced and output (S19). If n=m+1, an image of m=0 of the next track is reproduced and output (S20).

When the down switch 58 is turned on (S18), if m=0, an image of m (=n−1) of the immediately preceding track is reproduced and output (S23); if m≠0, m is decremented, and an image of m is reproduced and output (S22).

In this embodiment, in the multi-frame reproduction mode, an image to be reproduced is enlarged to a full frame size, but may be simply arranged at the center of the frame without being enlarged. FIG. 6D shows a display example in a 4 times multi-frame reproduction mode. "MULT 4" represents that the 4 times multi-frame reproduction mode is selected. "1-1" displayed on the upper right corner represents that an image of m=0 in the track #1 is reproduced. In this case, the outer frame portion of a displayed image is preferably displayed in a single color having uniform brightness.

Since n and m are recorded at the same time in the recording mode, a non-photographed image in a multi-frame image can be easily discriminated, and the reproduction/output operation of the corresponding image can be skipped.

Needless to say, in the recording mode, when m>0, n of the n times multi-frame mode is inhibited from being changed.

Figure 5:
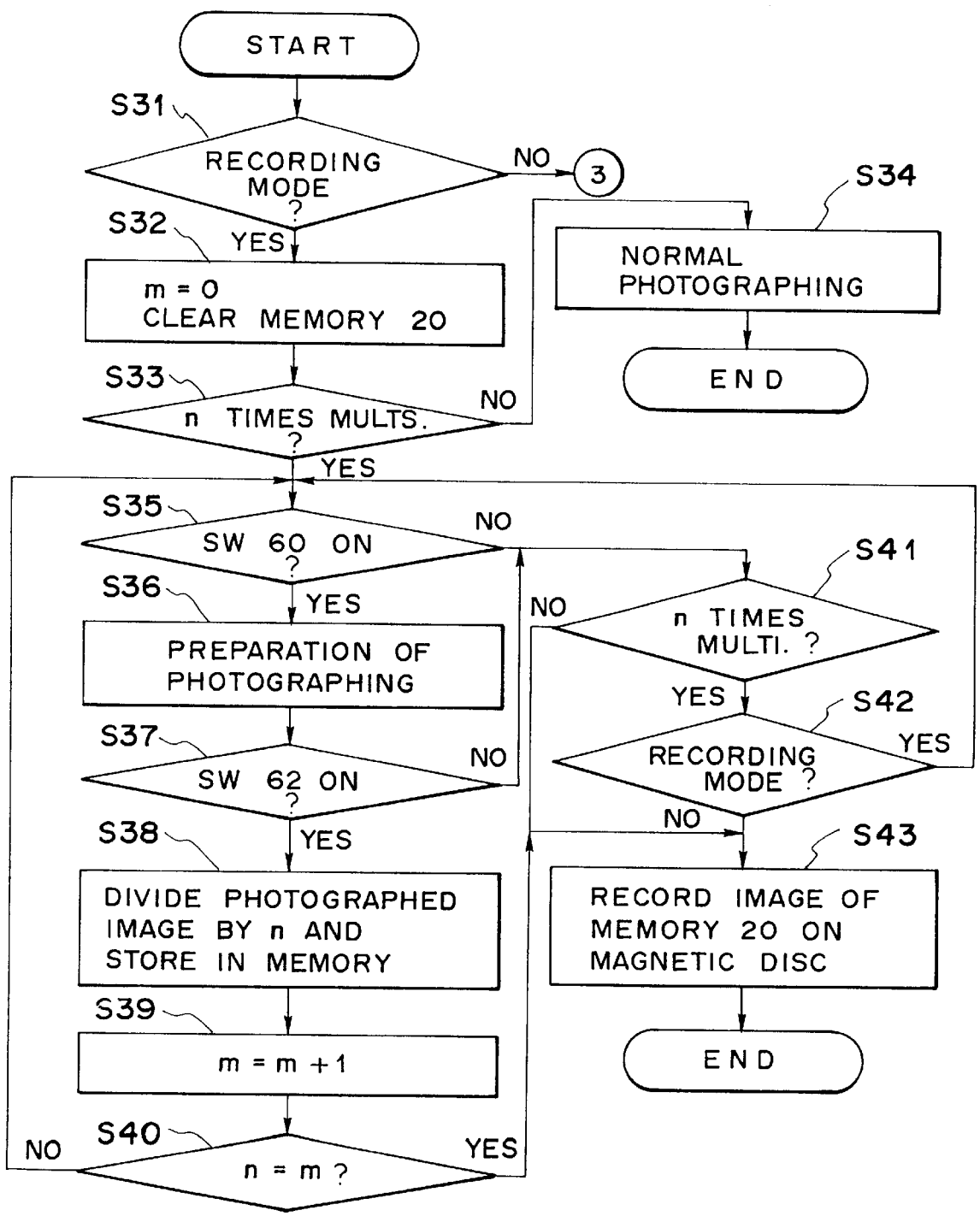
FIG. 5 is a flow chart showing a changing operation in a recording mode of this embodiment.

FIG. 5 is a flow chart showing a changing operation in the recording mode when the memory 20 has a storage capacity of only one frame (or field).

When the recording/reproduction switch 52 is set in the recording mode (S31), the system control circuit 42 clears the memory 20, and resets its internal counter m to 0 (S32). If the n times multi-frame mode is not selected (S33), a normal photographing operation is executed (S34).

If the n times multi-frame mode is selected (S33), and if the photographing preparation switch 60 is turned on (S35), the preparation for the photographing operation is performed (S36). When the photographing switch 62 is turned on (S37), a photographed image obtained by the image pickup element 14 is reduced to 1/n, and the reduced image is stored in the memory 20 (S38). Then, m is incremented by one (S39), and if n=m (S40), the images in the memory 20 are recorded on the magnetic disc 32 (S43), thus ending processing; if n≠m (S40), the control waits until the photographing preparation switch 60 is turned on (S35).

If the n times multi-frame mode is canceled (S41) before the photographing preparation switch 60 is turned on (S35), or before the photographing switch 62 is turned on (S37) even after the photographing preparation switch 60 is turned on and the preparation for the photographing operation is performed, or if the recording mode is canceled even in the n times multi-frame mode (S41, S42), the image in the memory 20 is recorded on the magnetic disc 32 (S43), thus encoding processing.

According to this embodiment, even when no magnetic disc 32 is loaded, one or a plurality of images are temporarily stored in the memory 20, and thereafter, can be recorded on the magnetic disc 32. Therefore, a photographing operation can be performed without the magnetic disc 32.

In the above embodiment, the magnetic disc is used as a recording medium. Of course, the present invention may be applied to a recording or reproduction apparatus using a solid-state memory device, an optical recording medium, or a magnetooptical recording medium. When a solid-state memory is used in a digital image recording mode, an ID signal can be digitally recorded simultaneously with image recording.

As can be easily understood from the above description, according to this embodiment, individual images in a multi-frame image can be easily reproduced in an enlarged scale.

What is claimed is:

1. A recording apparatus comprising:
   means for inputting image data of plural images;
   means for reducing the image data corresponding to the image data inputted by said means for inputting;
   means for combining reduced image data of the plural images, said reduced image data being reduced by said reducing means;
   means for counting the number of images which are combined by said combining means; and
   recording means for recording the reduced image data combined by said combining means and data indicating the number of images which are combined by said combining means in accordance with said counting means.

2. Apparatus according to claim 1, wherein said recording means records the reduced image data on a magnetic recording medium.

3. Apparatus according to claim 1, wherein said reducing means reduces the image data by thinning the image data.

4. Apparatus according to claim 1, wherein said combining means combines the reduced images on a memory having a capacity of at least one frame.

5. Apparatus according to claim 1, wherein said recording means records the reduced image data until said counting means counts to a predetermined number.

6. A recording apparatus comprising:
   means for inputting image data of plural messages obtained by picking up plural images;
   means for reducing the image data corresponding to the image data inputted by said means for inputting;
   means for combining reduced image data of plural images, said reduced image data being reduced by said reducing means;
   means for counting the number of the plural images which are combined by said combining means;
   recording means for recording the reduced image data combined by said combining means and data indicating the number of the plural images which are combined by said combining means in accordance with said counting means.

7. Apparatus according to claim 6, wherein said recording means records the reduced image data on a magnetic recording medium.

8. Apparatus according to claim 6, wherein said reducing means reduces the image data by thinning the image data.

9. Apparatus according to claim 6, wherein said combining means combines the reduced images in a memory having a capacity of at least one frame.

10. Apparatus according to claim 6, wherein said recording means records the reduced image data until said counting means counts to a predetermined number.

11. Apparatus according to claim 10, wherein said predetermined number is 16.

12. Apparatus according to claim 6, wherein said inputting means includes an optical system for transmitting an image to an image sensor which converts the image into the image data.

* * * * *